United States Patent Office 2,698,310
Patented Dec. 28, 1954

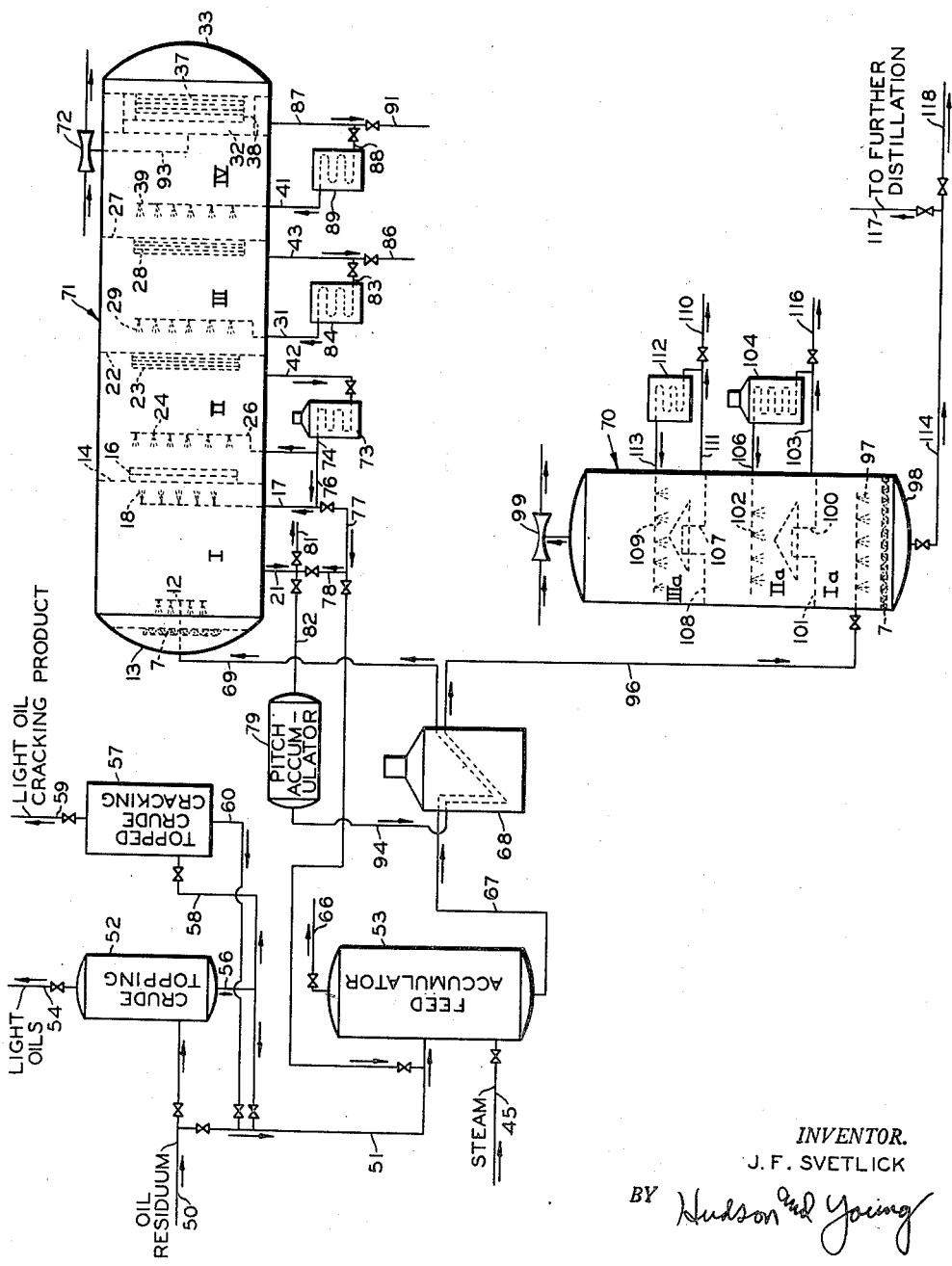

2,698,310

PROCESSING OF SULFUR-VULCANIZABLE MATERIALS AND RELATED COMPOSITIONS

Joseph F. Svetlik, Phillips, Tex., assignor to Phillips Petroleum Company, a corporation of Delaware Application April 6, 1951, Serial No. 219,593

15 Claims. (Cl. 260—33.6)

This invention relates to the plasticization of sulfur-vulcanizable organic plastic substances containing unsaturated carbon-to-carbon bonds, and to associated plasticizer-containing materials. In one embodiment this invention relates to a method for plasticizing natural and synthetic rubbers. In another embodiment this invention relates to new compositions comprising natural and synthetic rubbers each incorporated with a high softening point petroleum pitch, or a distillate recovered from such a pitch.

Rubber stocks are tough and nonplastic and must be softened or rendered in a plastic condition to facilitate processing of ingredients to be incorporated therewith. Examples of such ingredients are reinforcing pigments such as carbon black, fillers such as zinc oxide, various accelerators, sulfur, and the like. These compounding materials are among those which in various combinations impart to the vulcanizate improvements in such properties as abrasion resistance, flex life, hysteresis, resistance to tear, tensile strength, elongation, modulus, etc.

Mixing of tough rubber stocks with compounding ingredients is generally effected by means of mastication at a controlled temperature in the range of 50–350° F. Mastication involves mechanically kneading the rubber material, either by passing it through an open mill, i. e., passing it between rollers running at different speeds whereby it is subjected to compression followed by a shearing action, or by placing it in an enclosed mixer of the Banbury type where much the same effect is produced. The open mill and the Banbury type mixer comprise standard equipment in compounding rubber. Various known agents which are used to accelerate milling by virtue of their affinity for the rubber or rubber-like material and are referred to hereinafter as "plasticizers" or "softeners," i. e., as applied to synthetic, natural, and reclaimed rubber.

Various types of materials have been employed as softeners or plasticizers for both natural and synthetic rubbers and it is know that variations in properties of rubber products can be produced through the use of different plasticizing agents. A good plasticizer, in addition to softening a rubber stock, must give a finished product with other desirable properties. Some materials which exert the desired plasticizing action often have deleterious effects on other properties to the extent that the finished product, i. e. the vulcanizate, is of little value for many purposes.

I have now discovered novel softeners which, by their incorporation with rubber stocks, are good rubber plasticizers and tackifiers and impart other desirable properties to the rubber. These materials are applicable in compounding natural and synthetic rubbers and reclaimed rubber, and they can be used alone as softeners and tactifiers in a compounding recipe, or as mixtures with each other or in conjunction with other softeners. They are effective not only as plasticizers and tactifiers but also as rubber extenders and the rubber in which they are compounded forms vulcanizates having particularly good aged flex life, abrasion resistance and tensile strength.

An object of this invention is to provide a method for plasticizing a sulfur-vulcanizable organic plastic substance containing unsaturated carbon-to-carbon bonds. Another object is to provide new compositions each comprising a sulfur-vulcanizable organic plastic substance containing unsaturated carbon-to-carbon bonds incorporated with a residual high softening point petroleum pitch, or distillate recovered from such a pitch. Another object is to provide a method for plasticizing natural and synthetic rubbers. Another object is to provide for the utilization of a selected high softening point petroleum pitch as a plasticizer for natural and synthetic rubbers. Still another object is to provide a selected high softening point petroleum pitch as an extender for natural and synthetic rubber. Still another object is to provide for the plasticization of a high raw Mooney viscosity synthetic rubber substitute to produce a resulting extended and plasticized rubber stock of relatively low Mooney viscosity. It is yet another object to provide a new and improved method for milling a natural, synthetic, or reclaimed rubber stock. Still another object is to provide a heavy oil distillate, produced by vacuum distillation of a high softening point petroleum pitch, as a plasticizer-extender for natural rubber, reclaimed rubber, and synthetic rubber substitutes. Other objects will be apparent to those skilled in the art from the accompanying discussion and disclosure.

The term "sulfur-vulcanizable organic plastic substance containing unsaturated carbon-to-carbon bonds" is meant herein to be generic to natural rubber, reclaimed rubber, and synthetic rubber, the latter comprising synthetic rubbery polymers, or synthetic rubber-like materials or rubber substitutes as for example butadiene-styrene copolymers, Perbunan (copolymer of 1,3-butadiene and acrylonitrile), Butyl (copolymer of olefins and conjugated diolefins), GR–I (copolymer of olefins and diolefins—U. S. Rubber Reserve designation for Butyl rubber), Neoprene (rubber-like polymer of chloroprene), and the like.

In accordance with my invention I have provided a method for plasticizing and extending sulfur-vulcanizable organic plastic substances containing unsaturated carbon-to-carbon bonds, and new compositions comprising such sulfur-vulcanizable organic plastic materials incorporated with a high softening point petroleum pitch, or a distillate recovered from such a petroleum pitch, each of which materials are described in detail hereafter.

The high softening point pitch plasticizer-extenders of my invention are recovered by high vacuum reduction of residual hydrocarbon oils, particularly crude residual such as topped crude, residues from topped crude cracking, fuel oils, and the like, having a gravity often within the range of −5 to +5° API, and a viscosity at 210° F. generally above 70 Saybolt furol seconds. In one manner of recovering the pitch material, the residual oil charge stock is preheated to 600 to 900° F. under a pressure generally in the range of from atmospheric to 100 p. s. i. g. and then subjected to vacuum distillation at an absolute pressure in the range of from 0.01 to about 8 mm. mercury. The non-volatile residual pitch product utilized in the practice of my invention, generally has a gravity in the range of from 0 to −10° API and a softening point (ring and ball method) in the range of about 180 to 225° F. The residual pitch material thus formed can be used alone as a plasticizer and/or as an extender for natural, synthetic, or reclaimed rubber, or in conjunction with other plasticizers or extenders as desired.

The heavy oil distillates utilized in the practice of my invention are recovered from further vacuum distillation of the high softening point petroleum pitch described above. These distillates, although characterized by softening points within a broad range of 80 to 160° F., more often exhibit softening points within the limits of about 100 to 140° F. One mode of vacuum distillation means by which the petroleum pitch, and petroleum pitch distillates, described, can be obtained is set forth in detail hereinafter with reference to the attached drawing.

Various advantages accrue from the use of the plasticizer-extenders of my invention, particularly as applied to the plasticization of rubbery butadiene-styrene copolymers and natural rubber, with respect to unaged and aged 80° F. tensile strength, hot tensile strength, and aged flex life. My vulcanizates show particularly desirable characteristics as regards resilience, abrasion loss, tensile strength, and extrusion. Cure, or vulcanization, of such rubbers is often accelerated by the presence of my plasticizer-extenders.

My invention is particularly advantageous inasmuch as the high softening point petroleum pitch can be directly incorporated with the rubber or rubber-substitute, without the need for its incorporation with a liquid vehicle, whereas in accordance with various known methods in the art for utilizing normally solid materials as plasticizers, particularly for rubbers, the normally solid plasticizer is necessarily incorporated with a liquid vehicle, generally for the purpose of thinning the plasticizer so that it can be uniformly dispersed throughout the rubber material to be processed. In other known methods, the normally solid plasticizer is incorporated with another softener, the latter being a liquid, under which conditions the solid softener is more uniformly dispersed throughout the material being processed. In the practice of my invention it is unnecessary that the high softening point petroleum pitch be incorporated with a solvent or liquid vehicle of any kind for its incorporation with the rubber or rubber substitute, and in fact it is preferred that such a liquid carrier be not employed inasmuch as the presence of such supplemental material may in some cases have deleterious effects on the vulcanizate formed.

A high vacuum method by which petroleum pitch and pitch distillate materials employed in the practice of my invention can be prepared is described in detail in the co-pending application of Victor C. Cavin, Warren H. Acker, and Paul M. Waddill, Serial No. 188,604, filed October 5, 1950. In accordance with a preferred embodiment disclosed in that copending application an oil residuum, generally a topped crude or a residuum from a topped crude cracking operation, is heated to a temperature generally within the limits of 600 to 900° F. at which very little cracking takes place, or, more desirably, none at all. The heated liquid is discharged into a flash, or first section, of a distillation zone, which distillation zone is maintained at an overall absolute pressure generally below about 5-8 mm. mercury, and at preferably 0.1-3 mm. The heated charge upon being introduced into the first section is flashed, with the highest boiling components of the charge material remaining unvaporized. These unvaporized materials comprise residual pitch, a major proportion of which settles as liquid in the first section. As is inherent in all flash vaporization operations, particularly with heavy oils, a small portion of the unvaporized material is entrained in the flashed vapors as small finely divided liquid droplets, often appearing as a "fog" or mist. Such an entrainment of finely divided liquid droplets is typical of that also occurring in conventional vacuum distillation procedures.

These entrained "fog-like" materials must be removed from the vapor containing them in order that "clean" distillate fractions, i. e., of low carbon residue, be recovered. This is done by passing the vapors from the flash section, i. e., the first section, into a second section of the distillation zone downstream and adjacent the first section, against an atomized oil spray, which completely blankets the path of vapor flow, maintained at the same temperature or slightly above that of the vapors contacted therewith. The atomized liquid oil droplets are ejected from the spray nozzles under conditions affording each of them a greater momentum than that of each of the liquid droplets entrained in the vapor. In this manner the sprayed droplets impinge against the entrained droplets, and cause the impinged droplets to settle with the sprayed droplets to the bottom of the second section.

Vapors, having been contacted with the spray droplets under the conditions described, are free of entrained liquid and are passed from the second section into a third section of the distillation zone downstream from the second section and adjacent to it, against a relatively cool second oil spray, maintained at a temperature of from about 3 to 500° F., more preferably 5 to 75° F. lower than that of the vapors contacted therewith, to condense at least a portion of those vapors. Condensate thus formed settles in the bottom of the third section. Settled condensate is recovered from the third section as clean distillation product. Similarly, the process is continued in as many additional downstream sections as desired, and any uncondensed portions of original charge are removed from the final section of the distillation zone as vapors.

In order to illustrate further a preferred embodiment of apparatus and method disclosed in the copending application referred to above, reference is made to the attached drawing. With reference to the drawing, a residual hydrocarbon oil can be admitted from lines 50 and 51 directly into feed accumulator 53 for charging to our distillation system. We generally charge a topped crude or a topped crude cracking residuum to the vacuum distillation unit.

Virgin petroleum crude can be admitted from line 50 into crude topping tower 52, wherein a lighter crude oil fraction comprising light and heavy gas oils, gasoline and the like, is separated from crude residuum, the former being withdrawn from tower 52 through line 54 and the latter through line 56. Virgin topped crude in line 56 is passed to feed accumulator 53 via line 51, or preferably passed to topped crude cracking system 57, via line 58. Oil residuum cracking product is withdrawn from cracking system 57 through line 60 and is charged to feed accumulator 53 via line 51. Accumulator 53 is maintained at about atmospheric pressure and any vapors to be vented are discharged through line 66. Steam can be admitted to accumulator 53 through line 45 to strip out any traces of light ends and thereby reduce the load on vacuum producing means 72, described hereafter. Oil charge stock, such as a reduced crude, fuel oil, cracking still residue, cylinder stock, cracked topped crude or the like, as for example a residuum from topped crude cracking having a gravity within the limits of —5 to 5° API and a viscosity at 210° F. generally above 70 SFV, is withdrawn from accumulator 53 through line 67 and is passed into heater 68, wherein it is heated to a temperature generally within the limits of from about 600 to 900° F. under a pressure generally approximating atmospheric and not exceeding about 100 p. s. i. g. The heated oil is discharged from heater 68 through line 69 into horizontally disposed vacuum distillation chamber 71.

Vacuum chamber 71 is maintained at an absolute pressure preferably from 0.05 to 8 mm. of mercury and more generally within the limits of from 0.1 to 2 mm. of mercury. The absolute pressure in chamber 71 is maintained by a system of steam jets 72, maintained in communication with the interior of chamber 71 near its downstream end 33. I prefer to maintain the pressure drop through chamber 71 in the order of from 1 to 4 mm.

Liquid charge from line 69 is introduced into flash section I of chamber 71 as a spray through spray-nozzle assembly 12, in a direction toward wire mat 7, intermediate spray assembly 12 and the upstream end closure 13. In this manner, charge emitted toward mat 7 from spray-nozzle 12 is caused to suddenly reverse its direction of flow, and separation of unvaporized portions from the vaporized portion is thereby greatly accelerated, and sprayed droplets not vaporized coalesce on the mat with a minimum of splashing, thereby lessening the amount of liquid entrained in the vapors in section I. Discharge of the oil feed spray in section I in this manner also causes unvaporized droplets to flow against the flow of hot vapors, which facilitates further vaporization of those liquid charge droplets, thus further providing for a higher softening point residual unvaporized charge (petroleum pitch), and for increasing the yield of clean oil distillate.

A portion of the unvaporized material (petroleum pitch) in section I settles therein as liquid product. The portion of unvaporized material not settled as liquid product in section I is entrained in a highly dispersed state in the vapors therein, appearing generally as a mist or a fog. Vapors in section I passed downstream from spray-nozzle means 12 contain these entrained droplets which are removed by passing the vapors downstream from section I, into adjacent section II, through perforate section 16 of partition 14, and against the flow of an oil spray in section II, from spray-nozzles 24. Atomized droplets of oil are delivered from spray-nozzles 24 at a momentum higher than that if the entrained liquid droplets in the vapors contacted therewith, and impinge against those entrained droplets, whereby the atomized droplets and impinged droplets are caused to settle from the vapors as liquid in section II. The operation of the sprays in section II is critical in obtaining the desired results.

It is essential that the sprayed droplets have a momentum at least equal to and preferably much greater than the momentum of the droplets entrained in the vapors. When the ratio of the momentum of the sprayed liquid to the momentum of the entraining vapor stream is maintained within the limits of 1:1 and 125:1 a desired degree of separation is effected.

The temperature of the oil spray from spray-nozzle 24 is maintained at a level very nearly the same as that of vapors contacted therewith and it is important that these temperatures be at least as high as the vapor temperatures. In most cases in order to obtain maximum efficiency it will be necessary to keep the temperature of the oil spray, from spray-nozzles 24, above that of the entering vapors to offset heat losses by radiation and thereby prevent condensation in section II. Oil charge to spray-nozzles 24 is provided by withdrawing a portion of the settled liquid from the bottom of sections I and/or II and delivering same to nozzles 24. When withdrawing settled liquid from section II for charge to spray-nozzles 24, a portion of that liquid is withdrawn through line 42, heating that oil in heater 73 to a temperature of from about 15 to 30° F. above that of the vapors being passed through perforate section 16, and passing the heated oil through line 74 to line 26 and through spray-nozzles 24. The remaining portion of residual oil (pitch) in line 74 is passed through line 76. A portion of that oil in line 76 is passed through line 17 and spray-nozzles 18 and is directed toward the upstream side of perforate section 16 for the purpose of washing the surface of that perforate section, providing thereby for an unobstructed passage therethrough for vapors. The remaining portion of liquid in line 76 is passed through lines 77 and 78 into pitch accumulator 79, or it is withdrawn as product directly through line 81 as desired. Unvaporized liquid in section I is withdrawn through oil outlet line 21 and is passed through line 82 into pitch accumulator 79, or is withdrawn through line 81 as desired. Operating in the manner described above, the liquid products from the bottom of sections I and II, comprise a residual petroleum pitch utilized in the practice of my invention and are substantially the same materials. If the temperature of oil from spray-nozzles 24 is lower than that of the vapors passed through section 16, some condensate may be formed, and collected with residual pitch product in section II. Such a resulting mixture of pitch and oil distillate can be utilized as a plasticizer-extender in the practice of my invention.

Vapors passed downstream in section II from spray-nozzles 24 are free of entrained liquid and comprise vaporous fractions of clean oils. These vapors are passed from section II into adjacent section III, through perforate section 23 of partition 22 against a flow of atomized oil sprayed from spray-nozzles 29. Oil from spray-nozzles 29 is maintained at a temperature preferably from 5 to 75° F. lower than the temperature of vapors being passed from section II through perforate section 23 and momentum of the atomized oil droplets ejected from spray-nozzles 29 is maintained greater than that of the vapors contacted therewith, whereby the atomized droplets with condensate thereon and impinged entrained droplets are caused to settle from the vapor and to accumulate in the bottom of section III as a liquid distillate fraction. Condensate collected in the bottom of section III is withdrawn through oil outlet conduit 43 and is passed in part through line 83 to cooler 84 wherein it is cooled to the necessary temperature lower than that of vapors passed through perforate section 23. Liquid thus cooled in cooler 84 is supplied to conduit 31 and spray-nozzles 29 as the total oil charge thereto. Condensate in line 43 not returned to spray-nozzles 29 is withdrawn as a product of the process through line 86.

Uncondensed vapors free of entrained liquid are passed from section III into adjacent section IV, through perforate section 28 in partition 27, against the flow of oil spray emitted from spray-nozzles 39. It is desired that in section IV the maximum condensation be effected, i. e., the condensation of all remaining condensable vapors. It is important that a sufficient amount of oil spray be discharged from spray-nozzles 39 at a desired low temperature to effect complete condensation of all remaining condensable vapors, when contacting those vapors. In the distillation of oil residua as described herein, it is often advantageous that the temperature of oil spray ejected from spray-nozzles 39 be as low as 100° F. Condensate formed in section IV is collected in the bottom of section IV, and is withdrawn through line 87, and is discharged in part to line 88 and cooler 89 wherein it is cooled to the required low temperature, for utilization as oil charge to spray-nozzles 39. Condensate thus cooled in cooler 89 is delivered to oil inlet conduit 41 and spray nozzles 39. That portion of condensate in line 87 not delivered to spray-nozzles 39 is withdrawn as a product of the process through line 91. It is of course advantageous that the momentum of the atomized particles from spray-nozzles 39 be greater than that of the resulting entrained condensate particles in the vapor contacted, so that the impinged condensate droplets will be caused to settle with the atomized spray droplets, to the bottom of section IV. Purely as a precautionary measure vapor-liquid separator 32 is provided to remove any remaining highly dispersed condensate present in any vapors downstream from spray-nozzles 39 and thereby insure that no liquid material enters pressure reducing means 72. Any condensate separated in separator 32 is withdrawn through line 38 and discharged into the bottom of section IV for withdrawal through line 87. Pressure reducing means 72, chamber 71, is connected by line 93 to separator 32 for withdrawal therefrom of any remaining uncondensed vapors, and for maintaining the desired low pressure in chamber 71.

The residual pitch recovered from sections I and II of chamber 71 is further reduced at lower pressures in a second distillation chamber in an efficient manner to provide further yields of clean oil distillates, and residual pitch of higher softening point. This is done by withdrawing pitch from accumulator 79 through line 94 and passing same to heater 68 to heat it under the conditions discussed hereinabove with respect to heating the material from line 67. Heated residual pitch having a softening point usually in the range of from 180 to 210° F. and a gravity of from about 0.7 to 1.0° API is withdrawn from heater 68 at a temperature of from 600 to 900° F. through line 96 and passed into section Ia of upright vacuum distillation chamber 70. Heated residuum is passed into section Ia of chamber 70 through spray-nozzles 97 as a spray, in a direction toward the bottom end closure 98 of chamber 70, preferably against wire mat 7. A lower absolute pressure is maintained in chamber 70 than that maintained in chamber 71, the absolute pressure at the outlet end 99, i. e., near the vacuum producing means 99, being as low as 0.01 mm. Vapors containing entrained unvaporized charge droplets, rise from section I through capped chimney 100 in donut tray 101, into adjacent section IIa against the flow of oil spray from spray-nozzles 102. Oil emitted from spray-nozzles 102 is maintained at a temperature at least as high as that of vapors contacted therewith, and the momentum of the atomized particles discharged from spray-nozzles 102 is maintained at least as great as and preferably greater than that of entrained liquid droplets in the vapors contacted therewith. Under these conditions the atomized liquid droplets impinge upon the entrained droplets and the combined liquids are caused to settle to the bottom of section IIa. Liquid is withdrawn from the bottom of section IIa through line 103 and is passed into heater 104, wherein it is heated to a temperature slightly above that, as for example, from 15 to 30° F. higher, than the temperature of vapors passed into section IIa. Oil thus heated is passed from heater 104 through line 106 to spray-nozzles 102, as the oil charge thereto.

Vapors downstream from spray-nozzles 102 are free of entrained liquid and are passed through capped chimney 107 in donut tray 108 into section IIIa against the flow of an oil spray emitted from spray-nozzles 109, at a temperature lower than the vapors passed through chimney 107. The desired difference in temperature between oil from spray-nozzles 109 and vapors contacted therewith is dependent on the amount of condensation desired. Generally however, the temperature is reduced to such an extent that condensation of all condensable vapors is effected, and is from 3 to 500° F., preferably 5 to 75° F., lower than that of the vapors contacted therewith. The momentum of the atomized oil particles ejected from spray-nozzles 109 is maintained at least equal to and preferably greater than that of any particles of entrained condensate in the vapors and total condensate is collected in the bottom of section IIIa. Cool oil is supplied to spray-nozzles 109 by withdrawing a portion of the condensate accumulating in the bottom of section IIIa through line 111 and passing same through cooler 112 wherein the necessary cooling is effected. Oil discharged from cooler 112 is passed through line 113 to spray-nozzles 109. The remaining portion of condensate collected in section IIIa is withdrawn through line 110 as additional clean distillate product of the process. The remaining portion of entrained liquid removed from section IIa and not required for return to spray-nozzles 102, is withdrawn through line 116, and is substantially the same as the residual pitch material withdrawn through line 114.

A residual pitch product is withdrawn from chamber 70 through line 114 and has a higher softening point than that of the residual pitch product initially separated in chamber 71, and withdrawn from pitch accumulator 79. Pitch in line 114 can be passed to further storage or to a further vacuum distillation for the recovery of additional pitch distillates to be utilized as plasticizer-extenders in the practice of my invention.

By the utilization of chamber 70 in conjunction with chamber 71, as described, the overall yield of residual pitch is reduced and its softening point increased, and increased overall yields of distillates, higher than those recovered in the single distillation in chamber 71 are obtained.

The proportions of the plasticizers employed with respect to the rubber stock, in accordance with my invention vary, depending upon the type of rubber being processed and the properties desired in the finished product, i. e., the plasticizer-rubber product preceding or subsequent to vulcanization or both, as desired. Generally the amount of plasticizer employed is within the limits of from 1 to 50 parts by weight per 100 parts by weight of rubber stock. When plasticizing relatively high Mooney synthetic elastomers, for example those having raw Mooney values (ML-4) of 90 or above, as for example as high as 160, it is usually advantageous to employ relatively large quantities of plasticizer, for example from 15 to 50 parts by weight per 100 parts by weight of rubber. When plasticizing relatively low Mooney synthetic elastomer, i. e., those having a raw Mooney value below 90 such as 40 to 90, that amount is generally in the range of from about 1 to 25 parts, often from 2 to 10 parts. When referring herein to Mooney value it is meant that Mooney viscosity as determined in accordance with the ASTM method, D927-47T.

I can incorporate the softeners of my invention with the material to be plasticized by any suitable method, such as (1) adding the softener directly or as a dispersion to a synthetic rubber latex and then coagulating the latex in accordance with latex masterbatch procedure, or (2) introducing the softener on the mill.

Rubber or rubber-like materials containing the softeners of my invention are preferably cured or vulcanized for a period of time in the range of from 20 to 75 minutes. In the accompany claims, reference to a vulcanizate or product of vulcanization of a rubber or rubber-like material compound with a softener material of my invention means that the vulcanization occurred after admixture of these materials with each other.

The following examples serve to illustrate further my process for plasticizing natural and synthetic rubber, and new and novel plasticizer-containing compositions formed in accordance with my invention, by which I mean to include those new compositions in their form before vulcanization and also after vulcanization. The reactants and their proportions and the other specific ingredients employed, as illustrated in the examples, are presented as being typical and should not be construed to limit the invention unduly.

EXAMPLE I

Residuum from a topped crude recycle cracking operation having a gravity of −0.8° API was heated to a temperature of 718° F. and the heated residuum was introduced at a rate of 31 barrels per hour into the flash section of a horizontal vacuum distillation chamber of the type illustrated in the figure as a spray directed against the upstream end of that chamber. The absolute pressure of the vacuum chamber at the downstream end was about 2 mm. mercury and in the flash section was 4 mm. mercury. The oil spray was so directed that unvaporized liquid charge particles were directed against the flow of hot vapors in the flash section. Unvaporized feed comprising residual pitch, accumulated in part in the bottom of the flash section and was immediately withdrawn; a remaining minor part was entrained in the vapors as a finely divided mist or fog. Vapor containing these entrained charge droplets was passed from the flash section through a first low pressure drop baffle section made up of separate groups of elongated angle irons into an adjacent or second section downstream from the flash section. The momentum of the vapor entering the second section was 4.0 ft. pounds per second. An oil spray was maintained in the second section, in a direction toward the first baffle section. The momentum of atomized liquid droplets emitted from the oil spray was 428 ft. pounds per second, giving a ratio of sprayed liqiud momentum to vapor momentum of 107:1. The temperature of the oil spray was maintained at about the same level as that of the vapors passed through the first baffle member and contacted therewith. Atomized droplets of spray liquid impinged against the entrained liquid particles in the vapor contacted therewith, and these liquids settled to the bottom of the second section. The combined liquid withdrawn from the flash section and the second section, i. e., the residual pitch fraction, had a gravity of −5° API and a softening point of 210° F. and was recovered in a yield of 60 per cent based on the volume of material charged to the vacuum chamber. A portion of the liquid withdrawn from the second section was returned thereto as the oil spray referred to above.

Vapor, free of entrained liquid, was passed from the second section of the distillation chamber through a second low pressure drop baffle section similar to the first baffle section described, into an adjacent third or condensing section of the chamber, downstream from and adjacent to the second section. Vapors passed through the second baffle section were passed against the flow of an oil spray maintained in the condensing section at a temperature lower than that of the vapors, i. e., at about 386° F. Under these conditions a portion of the vapor was condensed, the resulting condensate being collected in the bottom of the condensing section. The momentum of the atomized oil spray was maintained at a level higher than that of the condensate droplets formed in the vapors, or formed on the surface of the sprayed droplets, and atomized oil spray and impinged droplets settled as condensate product in the bottom of the condensing section. Oil was supplied to the spray in the condensing section from the oil condensate collected in the bottom thereof.

The condensate collected in the bottom of the condensing section was a clean gas oil, and was recovered in a yield of 8.7 B/H or 28 per cent, based on the volume of the oil residuum material charged to the vacuum distillation chamber. This gas oil product had a gravity of 9.2° API and a carbon residue of 1.54.

Uncondensed vapors free of entrained liquid were passed from the condensing section through a third baffle section of the same kind as that discussed immediately hereabove, into a fourth section adjacent the third or condensing section. Vapors passed through the third baffle section were contacted with an oil spray maintained at a temperature of about 132° F., i. e., a much lower temperature than that utilized in the oil spray in the condensing section described above. Under these conditions substantially all the remaining vapors were condensed, resulting condensate settling in the bottom of the fourth section. The momentum of the atomized oil spray was maintained higher than the momentum of the vapors entering the fourth section in order to prevent entrainment as previously described. A portion of the liquid collected in the bottom of the fourth section was cooled and returned to that section as the cool oil spray. The remaining portion of liquid was recovered as the lightest gas oil fraction, and had a gravity of 15.1° API and a carbon residue of 0.2, and was recovered in a yield of 3.7 B/H or 12 per cent based on the volume of residuum material charged to the distillation chamber.

EXAMPLE II

15 B/H of a residual pitch distillation product obtained in accordance with the process of Example I and having a gravity of −5° API and a softening point of 210° F. was heated at about atmospheric pressure to 715° F., and charged to a bottom flash section of an upright vacuum distillation chamber maintained at an absolute pressure lower than that maintained in the horizontal chamber utilized in the processes of Example I, the pressure in the flash zone being about 2 mm. mercury, and about 1 mm. mercury at the downstream end. The reduced pressure in this chamber was maintained by a system of steam vacuum jets positioned near the downstream end.

Under these conditions, a portion of the residual pitch charge material, upon being admitted into the flash section of the upright distillation chamber was vaporized. A portion of the unvaporized particles settled immediately to the bottom of the flash section and minor portion remained entrained in the vapors. Vapors were passed from the flash section into an upper and adjacent section through a capped chimney conduit supported in a donut tray partition, against the flow of an oil spray maintained at about the same temperature as that of the vapors contacted therewith. The momentum of the atomized liquid ejected from the spray was about 318 ft. pounds per second and the momentum of the vapors admitted into the second section and contacted with the spray was 5.1 ft. pounds per second, giving a ratio of sprayed liquid momentum to vapor momentum of 62:1. Atomized spray droplets impinged upon the entrained droplets in the vapor contacted, and settled together with the latter to the bottom of the second section. A portion of the settled liquid in the second section was returned thereto as the oil spray and the remaining portion was withdrawn as a further reduced pitch product of our process. Vapors free of entrained liquid were passed from the second section upwardly into a third section in the upright chamber, through a similar baffle section the same as that made up by the donut tray and capped chimney described above. Vapors in the third section were condensed by contact with a cool oil spray, i. e., at 85° F., introduced into the third section. The condensation was substantially complete and the resulting condensate settled in the bottom of the third section. The momentum of the atomized droplets in the spray was maintained at a level higher than that of the condensate droplets formed in the vapors or on the surface of the sprayed droplets as previously discussed, and the atomized droplets together with the impinged droplets settled as condensate product to the bottom of the third section. A portion of the condensate collected in the bottom of the third section was cooled and returned as cool oil to the spray in the third section.

The reduced pitch product recovered as a bottom product from the upright flash chamber had a softening point of 222° F., which was an increase of 12° F. above that of the residual pitch obtained in the process of Example I. The yield was 10 B/H; 66.6 per cent based on charge to this step or 40 per cent based on the original charge to Example I. The liquid withdrawn from the first donut tray was substantially the same as that collected from the bottom of the flash section.

The liquid product withdrawn from the second donut tray described above was a green, heavy gas oil having carbon residue of 8.8 and a gravity of 7.0 API. The yield was 33.4 per cent based on charge to this step or 20 per cent based on the original charge to Example I.

EXAMPLE III

A petroleum pitch produced by the vacuum distillation of a residuum from a topped crude cracking operation, in accordance with the method described hereinabove with reference to the drawing, and characterized by the following properties:

| | |
|---|---|
| Specific gravity 60/60° F | [1] 1.11 |
| Penetration at 77° F. (100 g. for 5 sec.) | 1 |
| Penetration at 115° F. (50 g. for 5 sec.) | 1 |
| Penetration at 150° F. (100 g. for 5 sec.) | 33 |
| Softening point, ring and ball, °F | 202 |
| Ash, weight per cent | 0.3 |

[1] (−4.1° API).

was employed as a plasticizer for GR–S rubber, employing the following compounding recipe:

| | Parts by weight |
|---|---|
| GR–S | 100 |
| Furnace black (Philblack 0) | 50 |
| Zinc oxide | 3 |
| Flexamine [1] | 1 |
| Sulfur | 1.75 |
| Santocure [2] | 0.8 |
| Petroleum pitch | 10 |

[1] Physical mixture containing 65 wt. per cent of a complex diarylamine-ketone reaction product and 35 wt. per cent of N,N'-diphenyl-p-phenylenediamine.
[2] N-cyclohexyl-2-benzothizolesulfenamide.

The following known plasticizers were employed under the same conditions as controls:

(1) Paraflux (an asphaltic flux)
(2) Socony Type IV Hard (a petroleum hydrocarbon plasticizer which is an odorless, non-toxic, jet-black, granular solid with a melting point of about 210° F.)
(3) Mineral Rubber (an air blown bituminous residue from petroleum, density, 1.04, brittle solid, black, 310–325° F. softening point, ring and ball)

A 50–50 blend of Paraflux with the petroleum pitch defined above was also employed as a plasticizer, in the above compounding recipe.

Each stock was mixed in the "B" Banbury for 5 minutes with cold water circulating through the jackets to maintain the temperature below about 300° F. Addition of sulfur and accelerator (Santocure) was made on the mill after the initial Banbury mixing operation. The petroleum pitch plasticizer was ground into small granules and introduced directly into the compounding mixture without the necessity for its being associated with a liquid vehicle of any kind. The stocks were cured at 307° F. for 30 minutes and physical properties of the resulting vulcanizate were determined. The following evaluation data were obtained:

| Softener | PHR Softener | 80° F. | | | 200 F [a] Tensile, p. s. i. | ΔT° F. | Percent Resilience | Flex Life, M. | Shore Hardness | Abrasion loss [b] Gms. | Percent Compression set | MS 1½ at 212° F. | Extrusion at 250° F. | |
|---|---|---|---|---|---|---|---|---|---|---|---|---|---|---|
| | | 300 Per Cent Modulus, p. s. i. | Tensile, p. s. i. | Percent Elongation | | | | | | | | | In./Min. | Gms./Min. |
| Petroleum Pitch | 10.0 | 1,150 | 3,210 | 610 | 1,480 | 76.7 | 56.5 | 8.3 | 57 | 6.16 | 21.4 | 33.5 | 28.0 | 86.9 |
| Petroleum Pitch [c] | 5.0 | } 1,190 | 2,990 | 550 | 1,290 | 78.4 | 56.3 | 6.0 | 55.5 | 6.02 | 22.9 | 30.5 | 28.0 | 85.5 |
| Paraflux [c] | 5.0 | | | | | | | | | | | | | |
| Paraflux | 10.0 | 1,270 | 3,110 | 545 | 1,430 | 76.7 | 56.7 | 5.2 | 55.0 | 5.49 | 25.7 | 29 | 29.6 | 91.0 |
| Socony Type IV | 10.0 | 1,140 | 2,950 | 570 | 1,230 | 78.7 | 55.6 | 8.9 | 56 | 6.45 | 24.6 | 34 | 25.6 | 81.5 |
| Mineral Rubber | 10.0 | 1,460 | 2,890 | 495 | 1,230 | 77.7 | 56.1 | 6.5 | 58 | 6.25 | 25.1 | 34 | 26.6 | 80.5 |

OVEN AGED 24 HOURS AT 212° F.

| Softener | PHR | 300 Per Cent Modulus | Tensile | Percent Elongation | | ΔT° F. | Percent Resilience | Flex Life | Shore Hardness | Abrasion loss | | | | |
|---|---|---|---|---|---|---|---|---|---|---|---|---|---|---|
| Petroleum Pitch | 10.0 | 1,930 | 3,040 | 460 | | 66.6 | 62.8 | 7.6 | 64 | 7.23 | | | | |
| Petroleum Pitch [c] | 5.0 | } 2,050 | 2,950 | 405 | | 66.6 | 63.7 | 4.3 | 62.5 | 6.92 | | | | |
| Paraflux [c] | 5.0 | | | | | | | | | | | | | |
| Paraflux | 10.0 | 2,460 | 2,880 | 340 | | 65.9 | 64.4 | 4.9 | 63 | 6.26 | | | | |
| Socony Type IV | 10.0 | 1,960 | 2,850 | 410 | | 65.9 | 61.8 | 4.7 | 63 | 7.93 | | | | |
| Mineral Rubber | 10.0 | 2,430 | 2,860 | 350 | | 64.9 | 63.6 | 5.1 | 64 | 7.15 | | | | |

[a] 45 minute cure.
[b] 35 minute cure.
[c] 50–50 mixture (by weight).

EXAMPLE IV

A portion of the pitch of Example III was further employed as a plasticizer extender for GR-S rubber in various loadings from 10 to as high as 40 parts by weight per 100 parts by weight of GR-S (PHR) in the following compounding recipes, when using from 30 to 50 PHR of furnace black. Paraflux and mineral rubber, as controls, were employed in the same recipe when using a loading of 10 PHR, and 50 PHR of furnace black.

|  | Parts by Weight | | | | | | | | |
|---|---|---|---|---|---|---|---|---|---|
| GR-S | 100 | | | | | | | | |
| Zinc Oxide | 3 | | | | | | | | |
| Flexamine [1] | 1 | | | | | | | | |
| Sulfur | 1.75 | | | | | | | | |
| Santocure [1] | 0.8 | | | | | | | | |
| Furnace Black (Philblack O) | 50 | 50 | 40 | 40 | 30 | 30 | 30 | 50 | 50 |
| Petroleum Pitch | 10 | 25 | 10 | 25 | 20 | 30 | 40 | | |
| Paraflux | | | | | | | | 10 | |
| Mineral Rubber [1] | | | | | | | | | 10 |

[1] Described in Example III.

The compounded stocks were cured for 30 minutes at 307° F., and vulcanizates formed were evaluated. Resulting evaluation data are as follows:

EXAMPLE V

A topped crude cracking residuum was vacuum distilled, in accordance with the two stage vacuum distillation method illustrated with reference to the attached drawing. The petroleum pitch residue obtained as residual product through line 114 leading from upright distillation chamber 70 (see drawing), was further distilled under an absolute pressure of 92 microns to produce a heavy oil distillate in a yield of 66.3 liquid volume per cent based on the pitch distilled, i. e., discharged from chamber 70 into line 117. The heavy oil distillate thus obtained was characterized by the following properties:

Boiling range 835° F.–1041° F. plus
Carbon 90.6%; hydrogen 8.9%
Softening point (ring and ball), 118° F.
Pour point, 125° F.
Ductility 5 cm./min., 77° F.=110+ cms.
Penetration, 5 sec., 77° F. 100 gms.=50.

The heavy oil distillate thus formed was employed as a plasticizer-extender, together with controls, for both GR-S rubber and natural rubber in the following compounding recipes.

| | | | | | | | | | | | |
|---|---|---|---|---|---|---|---|---|---|---|---|
| GR-S | 100.0 | 100.0 | 100.0 | 100.0 | 100.0 | 100.0 | | | | | | |
| Natural Rubber (#1 Smoked Sheet) | | | | | | | 100.0 | 100.0 | 100.0 | 100.0 | 100.0 | 100.0 |
| Furnace Black (Philblack O) | 50.0 | 50.0 | 50.0 | 50.0 | 50.0 | 50.0 | 50.0 | 50.0 | 50.0 | 50.0 | 50.0 | 50.0 |
| Zinc Oxide | 3.0 | 3.0 | 3.0 | 3.0 | 3.0 | 3.0 | 4.0 | 4.0 | 4.0 | 4.0 | 4.0 | 4.0 |
| Stearite | | | | | | | 3.0 | 3.0 | 3.0 | 3.0 | 3.0 | 3.0 |
| Flexamine [1] | 1.0 | 1.0 | 1.0 | 1.0 | 1.0 | 1.0 | 1.0 | 1.0 | 1.0 | 1.0 | 1.0 | 1.0 |
| Santocure [1] | 0.8 | 0.8 | 0.8 | 0.8 | 0.8 | 0.8 | 0.5 | 0.5 | 0.5 | 0.5 | 0.5 | 0.5 |
| Heavy Oil [2] | 10.0 | 5.0 | | | | | 10.0 | 5.0 | | | | |
| Petroleum Pitch [3] | | | 5.0 | 10.0 | | | | | 5.0 | 10.0 | | |
| Paraflux [4] | | 5.0 | 5.0 | | | 10.0 | | 5.0 | 5.0 | | | 10.0 |
| Mineral Rubber [4] | | | | | 10.0 | | | | | | 10.0 | |
| Sulfur | 1.75 | 1.75 | 1.75 | 1.75 | 1.75 | 1.75 | 2.0 | 2.0 | 2.0 | 2.0 | 2.0 | 2.0 |

[1] Described in Example III.
[2] Described in the preceding tabulation.
[3] Petroleum pitch of Example III.
[4] Control described in Example III.

The compounded stocks were cured for 30 minutes at

*Evaluation of petroleum pitch*

| PHR Furnace Black [b] | Softener | PHR Softener | 80° F. | | | 200°F.[a] Tensile, p. s. i. | ΔT° F. | Percent resilience | Flex Life, M. | Shore hardness | Percent Comp. Set | Compound MS 1½ | Extrusion at 250° F. | |
|---|---|---|---|---|---|---|---|---|---|---|---|---|---|---|
| | | | 300 percent Modulus, p. s. i. | Tensile, p. s. i. | Percent Elongation | | | | | | | | In./Min. | Gm./Min. |
| 50 | Pitch | 10 | 1,040 | 2,780 | 590 | 1,310 | 78.4 | 56.0 | 12.7 | 57 | 21.0 | 35.5 | 25 | 74.5 |
| 50 | do | 25 | 530 | 2,430 | 795 | 1,270 | 114.6 | 50.9 | 31.2 | 55 | 20.5 | 27.5 | 25.5 | 76 |
| 40 | do | 10 | 710 | 2,820 | 660 | 1,090 | 69.6 | 59.1 | 16.0 | 53 | 20.3 | 28 | 22 | 67.5 |
| 40 | do | 25 | 380 | 1,690 | 780 | 600 | | 56.3 | 22.1 | 49 | 19.9 | 24 | 26 | 74.5 |
| 30 | do | 20 | 340 | 1,770 | 810 | 390 | | 60.7 | 19.5 | 45 | 19.5 | 21 | 26 | 72.5 |
| 30 | do | 30 | 280 | 1,240 | 895 | 210 | | 59.1 | 13.3 | 43 | 19.0 | 20 | 29.5 | 75 |
| 30 | do | 40 | 220 | 1,100 | 1,000 | 260 | | 56.3 | 31.2 | 41 | 19.1 | 18 | 28 | 76 |
| 50 | Paraflux | 10 | 1,110 | 2,740 | 545 | 1,070 | 73.3 | 58.3 | 7.5 | 55 | 25.1 | 31 | 25.5 | 70.5 |
| 50 | Mineral rubber | 10 | 1,100 | 2,740 | 570 | 1,130 | 76.7 | 56.5 | 6.7 | 56 | 27.2 | 37.5 | 24 | 69.5 |

OVEN AGED 24 HOURS AT 212° F.

| | | | | | | | | | | | | | | |
|---|---|---|---|---|---|---|---|---|---|---|---|---|---|---|
| 50 | Pitch | 10 | 1,680 | 2,880 | 450 | | 65.9 | 61.3 | 4.0 | 62 | | | | |
| 50 | do | 25 | 800 | 2,670 | 635 | | 80.4 | 55.2 | 10.7 | 59 | | | | |
| 40 | do | 10 | 1,220 | 2,830 | 510 | | 57.8 | 65.6 | 4.2 | 57 | | | | |
| 40 | do | 25 | 590 | 1,810 | 620 | | 68.3 | 61.3 | 7.2 | 53 | | | | |
| 30 | do | 20 | 490 | 1,830 | 655 | | 58.8 | 66.7 | 4.6 | 50 | | | | |
| 30 | do | 30 | 340 | 1,230 | 700 | | | 64.1 | 3.3 | 47 | | | | |
| 30 | do | 40 | 320 | 1,320 | 805 | | 109.1 | 60.1 | 8.8 | 45 | | | | |
| 50 | Paraflux | 10 | 2,280 | 2,800 | 350 | | 59.1 | 66.1 | 5.3 | 62 | | | | |
| 50 | Mineral rubber | 10 | 2,100 | 2,650 | 390 | | 60.8 | 64.1 | 7.9 | 63 | | | | |

[a] Maximum value.
[b] Philblack O.

307° F. Physical characteristics of the vulcanizates thus formed are tabulated as follows:

GR-S
[30 minute cure time.]

| Softener | PHR | Compound MS 1½ | 80° F. | | | 200° F. Maximum Tensile, p. s. i. | ΔT ° F. | Percent Resilience | Flex Life, M. | Shore Hardness | Abrasion loss, Gms. | Percent Compression Set | Extrusion | | Softener Incorporation Time, Minutes |
|---|---|---|---|---|---|---|---|---|---|---|---|---|---|---|---|
| | | | 300 Percent Modulus, p. s. i. | Tensile, p. s. i. | Percent Elongation | | | | | | | | In./Min. | Gms./Min. | |
| Heavy Oil a | 10 | 30 | 1,080 | 2,730 | 540 | 1,370 | 80.4 | 54.9 | 13.2 | 54 | 3.20 | 17.1 | 28.8 | 76.5 | 4.5 |
| Heavy Oil a | 5 | 30.5 | 1,240 | 2,830 | 505 | 1,500 | 76.0 | 56.9 | 7.9 | 55 | 3.34 | 17.9 | 28.8 | 76.5 | 5.5 |
| Paraflux | 5 | | | | | | | | | | | | | | |
| Petroleum Pitch | 5 | 32.5 | 1,140 | 2,980 | 550 | 1,710 | 74.3 | 57.2 | 13.7 | 56 | 3.49 | 18.3 | 26.2 | 73.5 | 6 |
| Paraflux | 5 | | | | | | | | | | | | | | |
| Petroleum Pitch | 10 | 35 | 1,270 | 3,260 | 575 | 1,740 | 77.7 | 54.7 | 15.2 | 57 | 3.47 | 16.1 | 25 | 70.5 | 1 |
| Mineral Rubber | 10 | 37 | 1,580 | 3,230 | 495 | 1,530 | 75.0 | 55.6 | 8.4 | 60 | 3.08 | 20.0 | 25.5 | 70.5 | 1 |
| Paraflux | 10 | 30 | 1,400 | 3,130 | 520 | 1,500 | 74.0 | 57.6 | 8.9 | 55 | 3.42 | 19.7 | 25.8 | 71.5 | 7 |

NATURAL RUBBER

| Softener | PHR | Compound MS 1½ | 300 Percent Modulus, p. s. i. | Tensile, p. s. i. | Percent Elongation | 200° F. Maximum Tensile, p. s. i. | ΔT ° F. | Percent Resilience | Flex Life, M. | Shore Hardness | Abrasion loss, Gms. | Percent Compression Set | In./Min. | Gms./Min. | Softener Incorporation Time, Minutes |
|---|---|---|---|---|---|---|---|---|---|---|---|---|---|---|---|
| Heavy Oil a | 10 | 32.5 | 1,180 | 3,300 | 575 | 2,370 | 56.1 | 65.7 | b9 | 55 | 6.20 | 17.3 | 39.5 | 77.5 | 5 |
| Heavy Oil a | 5 | 33.5 | 1,180 | 3,400 | 570 | 2,820 | 51.3 | 69.4 | b9 | 55 | 6.12 | 16.7 | 38.5 | 76 | 6 |
| Paraflux | 5 | | | | | | | | | | | | | | |
| Petroleum Pitch | 5 | 35.0 | 1,160 | 3,420 | 575 | 2,770 | 49.7 | 68.3 | b11 | 54 | 6.58 | 17.3 | 37 | 75 | 4 |
| Paraflux | 5 | | | | | | | | | | | | | | |
| Petroleum Pitch | 10 | 36.5 | 1,080 | 3,250 | 570 | 2,850 | 52.4 | 68.3 | b13 | 55 | 7.06 | 16.1 | 37 | 73 | 1.5 |
| Mineral Rubber | 10 | 39 | 1,450 | 3,350 | 515 | 2,990 | 49.0 | 69.7 | b7 | 55 | 6.28 | 20.3 | 33.5 | 67.5 | 1.5 |
| Paraflux | 10 | 34 | 1,260 | 3,280 | 520 | 2,930 | 48.3 | 70.9 | b9 | 54 | 6.54 | 18.8 | 37.5 | 74 | 4.5 |

OVEN AGED 24 HRS. AT 212° F.
GR-S
[30 minute cure time.]

| Softener | PHR | 80° F. | | | ΔT° F. | Percent Resilience | Flex Life, M. | Shore Hardness | Abrasion Loss, Gms. |
|---|---|---|---|---|---|---|---|---|---|
| | | 300 Percent Modulus, p. s. i. | Tensile, p. s. i. | Percent Elongation | | | | | |
| Heavy Oil a | 10 | 1,830 | 2,900 | 450 | 64.5 | 60.0 | 6.4 | 60 | 3.90 |
| Heavy Oil a | 5 | 1,950 | 2,880 | 405 | 63.5 | 61.9 | 7.0 | 62 | 3.88 |
| Paraflux | 5 | | | | | | | | |
| Petroleum Pitch | 5 | 1,940 | 3,000 | 440 | 63.5 | 61.6 | 8.0 | 63 | 4.23 |
| Paraflux | 5 | | | | | | | | |
| Petroleum Pitch | 10 | 1,820 | 3,230 | 480 | 65.9 | 59.7 | 7.1 | 64 | 4.29 |
| Mineral Rubber | 10 | 2,350 | 3,120 | 395 | 61.2 | 61.5 | 10.5 | 66 | 3.86 |
| Paraflux | 10 | 2,240 | 3,130 | 400 | 62.2 | 63.5 | 6.3 | 63 | 3.79 |

NATURAL RUBBER

| Softener | PHR | 300 Percent Modulus, p. s. i. | Tensile, p. s. i. | Percent Elongation | ΔT° F. | Percent Resilience | Flex Life, M. | Shore Hardness | Abrasion Loss, Gms. |
|---|---|---|---|---|---|---|---|---|---|
| Heavy Oil a | 10 | 1,340 | 2,550 | 475 | 51.3 | 67.8 | 83.3 | 58 | 7.40 |
| Heavy Oil a | 5 | 1,270 | 2,590 | 480 | 46.9 | 71.4 | b47 | 59 | 7.72 |
| Paraflux | 5 | | | | | | | | |
| Petroleum Pitch | 5 | 1,340 | 2,450 | 470 | 46.6 | 72.5 | b42 | 58 | 8.56 |
| Paraflux | 5 | | | | | | | | |
| Petroleum Pitch | 10 | 1,130 | 2,470 | 520 | 49.0 | 70.6 | b32 | 59 | 8.87 |
| Mineral Rubber | 10 | 1,650 | 2,530 | 415 | 43.6 | 71.9 | b54 | 60 | 7.95 |
| Paraflux | 10 | 1,570 | 2,470 | 425 | 44.6 | 72.5 | 63 | 58 | 7.65 | a Distillate from Petroleum Pitch, described above.
b Percent broken at 50,000 flexures.

As will be evident to those skilled in the art, various modifications can be made or followed, in the light of the foregoing disclosure and discussion, without departing from the spirit or scope of the disclosure or from the scope of the claims.

I claim:
1. A rubbery composition of matter comprising an unsaturated sulfur-vulcanizable, rubbery, organic polymer having incorporated therein, as an additive, a plasticizing amount, in the range 1 to 50 parts by weight per 100 parts by weight of said polymer, of a pitch obtained as a residue of the noncracking vacuum distillation of a high-boiling residual petroleum oil at an absolute pressure in the range 0.01 to 8 mm. Hg, said oil having a gravity in the range −5 to +5° API and a viscosity above 70 Saybolt furol seconds at 210° F., said pitch having a gravity in the range 0 to −10° API and a softening point (ring and ball) in the range 180 to 225° F.

2. A method which comprises incorporating, as an additive, into an unsaturated, sulfur-vulcanizable, rubbery, organic polymer, a plasticizing amount, in the range 1 to 50 parts by weight per 100 parts by weight of said polymer, of a pitch obtained as a residue of the noncracking vacuum distillation of a high-boiling residual petroleum oil at an absolute pressure in the range 0.01 to 8 mm. Hg, said oil having a gavity in the range −5 to +5° API and a viscosity above 70 Saybolt furol seconds at 210° F., said pitch having a gravity in the range 0 to −10° API and a softening point (ring and ball) in the range 180 to 225° F.; and recovering a rubbery plasticized material as a product of said method.

3. The composition of claim 1 wherein said polymer has a raw Mooney value (ML-4) in the range 90 to 160 and the amount of said pitch is in the range 15 to 50 parts by weight per hundred parts by weight of said polymer.

4. The composition of claim 1 wherein said polymer has a raw Mooney value (ML-4) in the range 40 to 90 and the amount of said pitch is in the range 1 to 25 parts by weight per hundred parts by weight of said polymer.

5. The composition of claim 4 wherein the amount of said pitch is in the range 2 to 10 parts by weight per hundred parts of said polymer.

6. The composition of claim 1 wherein said pitch is obtained by the distillation of said oil at a pressure in the range 0.05 to 8 mm. of mercury.

7. The composition of claim 1 wherein said pitch is obtained by distillation of said oil at a pressure in the range 0.1 to 2 mm.

8. A composition according to claim 1 wherein said polymer is a butadiene-styrene copolymer.

9. A composition according to claim 1 wherein said polymer is natural rubber.

10. A composition according to claim 1 wherein said polymer is a copolymer of 1,3-butadiene and acrylonitrile.

11. A composition according to claim 1 wherein said polymer is a copolymer of an olefin and a diolefin.

12. A composition according to claim 1 wherein said polymer is reclaimed rubber.

13. The method of claim 2 wherein said pitch is incorporated into said organic substance by milling.

14. The method of claim 2 wherein said pitch is incorporated into said organic substance while the latter is in latex form.

15. The method of claim 2 wherein said pitch is obtained by vacuum distillation of said residual petroleum oil at a pressure in the range 0.05 to 8 mm. of mercury.

References Cited in the file of this patent

UNITED STATES PATENTS

| Number | Name | Date |
|---|---|---|
| 1,611,436 | Hall | Dec. 21, 1926 |
| 2,180,367 | Rostler et al. | Nov. 21, 1939 |
| 2,323,336 | Knorr | July 6, 1943 |
| 2,324,980 | Kilbourne | July 20, 1943 |
| 2,350,007 | Zerbe | May 30, 1944 |
| 2,409,437 | La Crosse | Oct. 15, 1946 |
| 2,415,541 | Soday | Feb. 11, 1947 |
| 2,470,141 | Caves | May 17, 1949 |